(12) United States Patent
Hwang et al.

(10) Patent No.: US 9,650,262 B2
(45) Date of Patent: May 16, 2017

(54) SUPERHYDROPHILIC FILTER STRUCTURE FOR SELECTIVELY SEPARATING WATER AND OIL

(71) Applicant: POSTECH ACADEMY-INDUSTRY FOUNDATION, Pohang-si (KR)

(72) Inventors: Woon Bong Hwang, Pohang-si (KR); Handong Jo, Seoul (KR); Dong Seob Kim, Daegu (KR); Yeong Ae Kim, Incheon (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 220 days.

(21) Appl. No.: 14/408,319

(22) PCT Filed: Jun. 24, 2013

(86) PCT No.: PCT/KR2013/005556
§ 371 (c)(1),
(2) Date: Dec. 16, 2014

(87) PCT Pub. No.: WO2014/003393
PCT Pub. Date: Jan. 3, 2014

(65) Prior Publication Data
US 2015/0203370 A1    Jul. 23, 2015

(30) Foreign Application Priority Data

Jun. 28, 2012    (KR) ........................ 10-2012-0070040

(51) Int. Cl.
| | | |
|---|---|---|
| B01D 29/00 | (2006.01) | |
| B01D 29/46 | (2006.01) | |
| B01D 29/31 | (2006.01) | |
| C02F 1/40 | (2006.01) | |
| B01D 17/00 | (2006.01) | |
| B01D 15/08 | (2006.01) | |

(Continued)

(52) U.S. Cl.
CPC ............... *C02F 1/40* (2013.01); *B01D 15/08* (2013.01); *B01D 17/085* (2013.01); *B01D 29/56* (2013.01);
(Continued)

(58) Field of Classification Search
CPC ............ B01D 15/08; B01D 2239/0421; B01D 39/10; B01D 37/10; B01D 29/56; C02F 1/40
(Continued)

(56) References Cited

U.S. PATENT DOCUMENTS

| | | | | |
|---|---|---|---|---|
| 4,749,482 A * | 6/1988 | Bonn | .................... | B01D 25/215 100/115 |
| 2009/0008316 A1* | 1/2009 | Verhaeghe | ............. | B01D 25/26 210/230 |

(Continued)

FOREIGN PATENT DOCUMENTS

| | | |
|---|---|---|
| CN | 102029079 | 4/2011 |
| CN | 102462977 | 5/2012 |

(Continued)

OTHER PUBLICATIONS

Office Action, SIPO, Apr. 14, 2016, Chinese Patent Application No. 201380034238.X.

*Primary Examiner* — Ana Fortuna
(74) *Attorney, Agent, or Firm* — Lex IP Meister, PLLC

(57) ABSTRACT

A filter structure capable of efficiently separating water and oil using wettability is provided. The filter structure includes a first filter layer including a plurality of openings and a second filter layer including a plurality of openings and positioned so as to be overlapped with the first filter layer at a distance from each other. The first filter layer and the second filter layer include surfaces each having a dual-scale protrusion and depression structure as a combination of a micro-scale structure and a nano-scale structure, and thus have superhydrophilicity and selectively allow water from a water and oil mixture to pass therethrough.

8 Claims, 6 Drawing Sheets

(51) Int. Cl.
  *B01D 29/56*   (2006.01)
  *B01D 39/10*   (2006.01)
  *C02F 1/28*    (2006.01)
  *C02F 101/32*      (2006.01)
  *C02F 103/00*      (2006.01)
  *C02F 103/08*      (2006.01)
  *E02B 15/08*       (2006.01)

(52) U.S. Cl.
  CPC .............. *B01D 39/10* (2013.01); *C02F 1/281* (2013.01); *B01D 2239/0421* (2013.01); *C02F 2101/32* (2013.01); *C02F 2103/007* (2013.01); *C02F 2103/08* (2013.01); *E02B 15/08* (2013.01)

(58) Field of Classification Search
  USPC .................. 210/484, 488–489, 492
  See application file for complete search history.

(56) References Cited

U.S. PATENT DOCUMENTS

| | | | | |
|---|---|---|---|---|
| 2009/0184504 | A1* | 7/2009 | Greenwood | B01D 46/24 280/741 |
| 2009/0308090 | A1* | 12/2009 | Matracea | B01D 46/10 62/171 |
| 2012/0014730 | A1* | 1/2012 | Yoshizawa | G03G 15/5029 399/389 |
| 2012/0067015 | A1* | 3/2012 | Greenwood | B01D 46/0001 55/490 |
| 2012/0258459 | A1* | 10/2012 | Huang | B01L 3/5021 435/6.11 |
| 2013/0008851 | A1* | 1/2013 | Jarvis, Jr. | E03F 5/0404 210/499 |
| 2015/0203370 | A1* | 7/2015 | Hwang | C02F 1/40 210/291 |

FOREIGN PATENT DOCUMENTS

| | | |
|---|---|---|
| JP | 2005-111326 | 4/2005 |
| KR | 10-0742696 | 7/2007 |
| KR | 100786678 | 12/2007 |
| KR | 20100101977 | 9/2010 |
| KR | 10-1037192 | 5/2011 |
| KR | 1020110096039 | 8/2011 |

* cited by examiner

SUPERHYDROPHILIC FILTER STRUCTURE FOR SELECTIVELY SEPARATING WATER AND OIL

TECHNICAL FIELD

The present invention relates to a filter structure capable of selectively separating water and oil, and more particularly, to a filter structure capable of efficiently separating water and oil using wettability.

BACKGROUND ART

Water pollution caused by industrial wastewater including a large amount of oil and oil spilled from a ship has had disastrous effects on the ecosystem, and an enormous amount of economic cost and time is required to restore polluted areas. For this reason, a technology for separating water and oil in wastewater and oil spilled on the sea has been suggested.

As conventional technologies of separating water and oil, an adsorption method and a gravity separation method are known. The adsorption method is a method of selectively absorbing oil only with an adsorbent. This method is limited in the amount of oil to be removed at once, and additional costs and secondary environmental pollution may be caused by treating the adsorbent absorbing oil.

The gravity separation method is a method of removing oil floating on water using a gravity difference between the water and the oil, and does not use consumables such as an adsorbent, resulting in a reduction in costs. However, this method has low efficiency in separating oil, and the separated oil includes lots of water, which makes it difficult to recycle the separated oil.

DISCLOSURE

Technical Problem

The present invention has been made in an effort to provide a superhydrophilic filter structure which has a simple structure and is capable of separating and collecting oil from water and oil mixtures with high efficiency.

Technical Solution

An exemplary embodiment of the present invention provides a filter structure including a first filter layer including a plurality of openings and a second filter layer including a plurality of openings and positioned so as to be overlapped with the first filter layer at a distance from each other. The first filter layer and the second filter layer include surfaces each having a dual-scale protrusion and depression structure as a combination of a micro-scale structure and a nano-scale structure, and thus have superhydrophilicity and selectively allow water from a water and oil mixture to pass therethrough.

Each of the first filter layer and the second filter layer may be formed of a metal mesh made from a metal wire in the form of a mesh.

The protrusion and depression structure may include a first fine protrusion and depression structure formed in a micro-scale and a second fine protrusion and depression structure formed in a nano-scale along curves of the first fine protrusion and depression structure on a surface of the first fine protrusion and depression structure. The first fine protrusion and depression structure may be formed by any one method of sandblasting, shot blasting, plasma etching, a discharge treatment, and a laser treatment. The second fine protrusion and depression structure may be formed by an anodic oxidation process.

A water layer may be present between the first filter layer and the second filter layer. The water layer may be formed by allowing water only to pass through the filter structure or by dipping the filter structure in water.

An absorption layer may be present between the first filter layer and the second filter layer. The absorption layer may include at least one selected from hydrogel, silica gel, activated alumina, zeolite, activated carbon, fabric, and sponge.

A reinforcing member may be present between the first filter layer and the second filter layer. The reinforcing member may be formed into any one of a metal rod, a metal mesh, a polymer rod, and a polymer mesh.

Advantageous Effects

A filter structure has a simple structure, can be used for various purposes, and is capable of separating oil from water and oil mixtures with a high efficiency and easily collecting the oil.

MODE FOR INVENTION

The present invention will be described more fully hereinafter with reference to the accompanying drawings, in which exemplary embodiments of the invention are illustrated. As those skilled in the art would realize, the described embodiments may be modified in various different ways, all without departing from the spirit or scope of the present invention.

Figure 1:
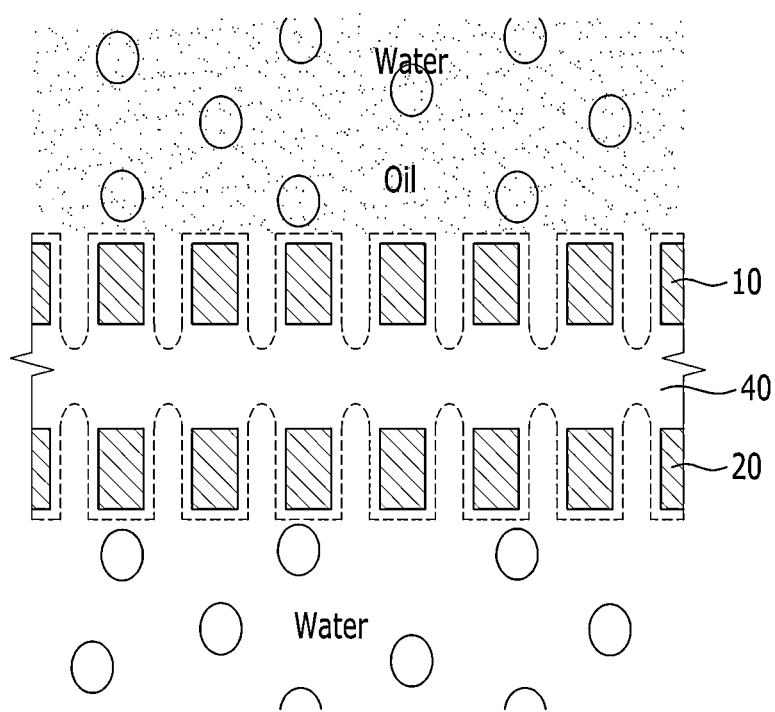
FIG. 1 is a schematic diagram illustrating a filter structure according to a first exemplary embodiment of the present invention.
Figure 2:
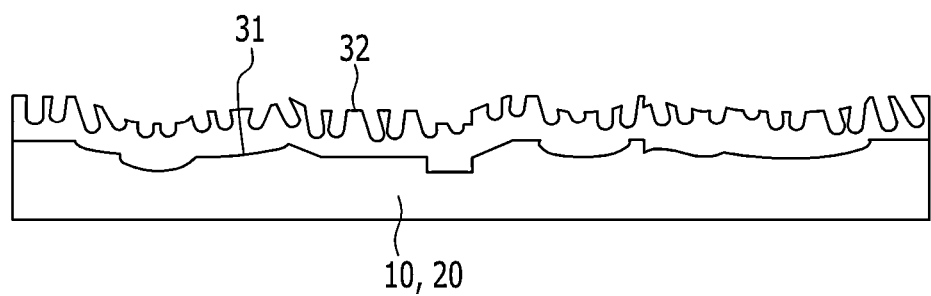
FIG. 2 is an enlarged diagram of a surface of a first filter layer and a second filter layer illustrated in FIG. 1.

FIG. 1 is a schematic diagram illustrating a filter structure according to a first exemplary embodiment of the present invention, and FIG. 2 is an enlarged diagram of a surface of a first filter layer and a second filter layer illustrated in FIG. 1.

Referring to FIG. 1 and FIG. 2, a filter structure 100 according to a first exemplary embodiment of the present invention includes a first filter layer 10 including a plurality of openings and a second filter layer 20 including a plurality of openings and positioned so as to be overlapped with the first filter layer 10 at a distance from each other.

Each of the first filter layer 10 and the second filter layer 20 may be formed of a metal mesh made from a metal wire in the form of a mesh. Otherwise, each of the first filter layer 10 and the second filter layer 20 may be formed of a metal plate including a plurality of openings. The metal mesh can be flexibly deformed and has high strength, and thus it can be usefully applied as compared with the metal plate.

The first filter layer 10 and the second filter layer 20 include surfaces on which a first fine protrusion and depression structure 31 is formed in a micro-scale and a second fine protrusion and depression structure 32 is formed in a nano-scale along curves of the first fine protrusion and depression structure 31. Therefore, the first filter layer 10 and the second filter layer 20 have a superhydrophilic surface having a contact angle of less than 10° due to a dual-scale protrusion and depression structure as a combination of a micro-scale structure and a nano-scale structure.

Herein, a micro-scale means a size in the range of 1 μm or more to less than 1000 μm, and a nano-scale means a size in the range of 1 nm or more to less than 1000 nm. The wettability means the extent of wetting easiness of water against a solid surface, and can be measured by a contact angle between a certain liquid and a solid surface. The case where a contact angle of a liquid is less than 90° is referred to as "hydrophilicity" and the case where a contact angle of a liquid is less than 10° is referred to as "superhydrophilicity".

The first fine protrusion and depression structure 31 in a micro-scale imparts hydrophilicity to the first filter layer 10 and the second filter layer 20. The first fine protrusion and depression structure 31 may be formed by any one method of sandblasting, shot blasting, plasma etching, a discharge treatment, and a laser treatment.

The sandblasting is a method in which fine protrusions and depressions are formed by spraying fine sand particles using compressed air so as to collide with a target object. In the shot blasting, metallic or non-metallic fine particles called "shot" or "grit" are sprayed so as to form fine protrusions and depressions on a target object.

In the plasma etching, instead of an etching solution, gaseous plasma is used to etch a surface of a target object so as to form fine protrusions and depressions on the surface of the target object. The discharge treatment is a method in which a surface of a target object is melted with high-temperature heat generated by electric discharge and then re-solidified, and fine protrusions and depressions are formed of irregular cracks and bubbles on the electrically-discharged surface of the target object. In the laser treatment, fine protrusions and depressions are formed by irradiating a high-power laser pulse to a target object and ablating a surface thereof.

The second fine protrusion and depression structure 32 in a nano-scale imparts superhydrophilicity to the first filter layer 10 and the second filter layer 20. The second fine protrusion and depression structure 32 may be formed by an anodic oxidation process.

An anodic oxidation device (not illustrated) used in an anodic oxidation process may include a circulating tank in which cooling water is circulated and a magnet stirrer which stirs an electrolyte solution within the tank at a constant speed. The anodic oxidation process is carried out by immersing the first and second filter layers 10 and 20 and a counter electrode in the electrolyte solution within the tank and applying anode power and cathode power to the first and second filter layers 10 and 20 and the counter electrode, respectively.

As the anodic oxidation process proceeds, an oxide film is formed on the surfaces of the first and second filter layers 10 and 20, and fine grooves in a nano-scale are formed on the oxide film. The oxide film and the fine grooves are formed along curves of the first fine protrusion and depression structure 31, and thus on the surfaces of the first and second filter layers 10 and 20, a dual-scale protrusion and depression structure as a combination of the first fine protrusion and depression structure 31 and the second fine protrusion and depression structure 32 is formed.

In the filter structure 100, if the second fine protrusion and depression structure 32 is formed by the anodic oxidation process, the first filter layer 10 and the second filter layer 20 may be formed of a metal, for example, aluminum or titanium, which can be anodically oxidized.

Since the surfaces of the first filter layer 10 and the second filter layer 20 exhibit superhydrophilicity, the filter structure 100 has high wettability and allows water to easily pass therethrough. Therefore, when a solution such as a mixture of oil and water is allowed to pass through the filter structure 100, the water easily passes through the first filter layer 10 and the second filter layer 20 but the oil cannot pass through the first and second filter layers 10 and 20 due to a repulsive force with respect to the water.

At this time, the first filter layer 10 and the second filter layer 20 include water therebetween. That is, a water layer 40 is present between the first filter layer 10 and the second filter layer 20. The water layer 40 may be formed by allowing only water to pass through the filter structure 100 or by dipping the filter structure 100 in water before the filter structure 100 is used.

Although FIG. 1 illustrates an example where the filter structure 100 includes the two filter layers 10 and 20, three or more filter layers may be included. In any case, each filter layer is positioned away from its adjacent filter layer and a water layer is present between two adjacent filter layers.

If a water and oil mixture is allowed to pass through the filter structure 100 at a constant pressure, the water easily passes through the filter structure 100, whereas the oil cannot pass through the filter structure 100 due to a repulsive force with respect to the water layer 40. Therefore, the filter structure 100 can selectively discharge the water from the water and oil mixture and separate the water and the oil with high efficiency.

Figure 3:
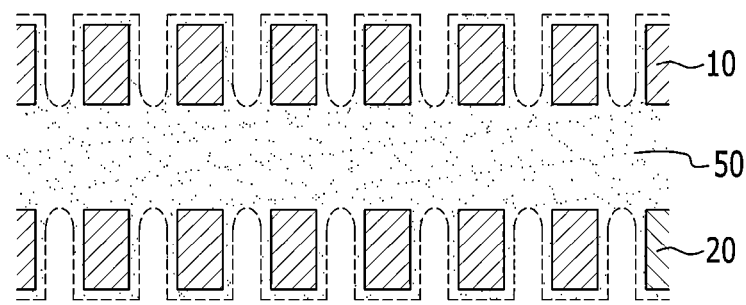
FIG. 3 is a schematic diagram illustrating a filter structure according to a second exemplary embodiment of the present invention.

FIG. 3 is a schematic diagram illustrating a filter structure according to a second exemplary embodiment of the present invention.

Referring to FIG. 3, a filter structure 110 of the second exemplary embodiment has the same configuration as the above-described filter structure of the first exemplary embodiment except that an absorption layer 50 is present between the first filter layer 10 and the second filter layer 20. The same members as those of the first exemplary embodiment are assigned the same reference numerals, respectively.

The absorption layer 50 has a function of absorbing and storing water so as to maintain a water layer between the first filter layer 10 and the second filter layer 20. Therefore, the filter structure 110 including the absorption layer 50 can prevent deviation of the water layer even at a high pressure. Further, the absorption layer 50 has a function of preventing deformation of the filter structure 110 caused by a pressure.

The absorption layer 50 may include at least one selected from hydrogel, silica gel, activated alumina, zeolite, activated carbon, fabric, and sponge.

Figure 4:
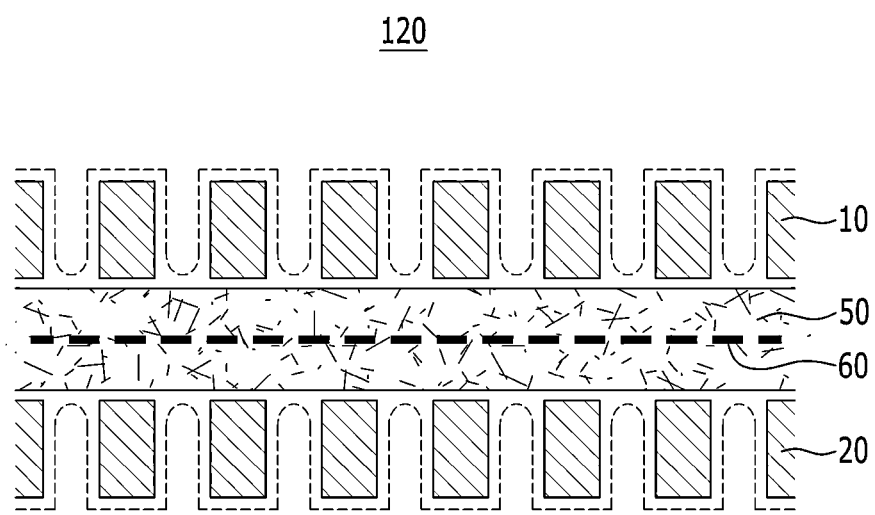
FIG. 4 is a schematic diagram illustrating a filter structure according to a third exemplary embodiment of the present invention.

FIG. 4 is a schematic diagram illustrating a filter structure according to a third exemplary embodiment of the present invention.

Referring to FIG. 4, a filter structure 120 of the third exemplary embodiment has the same configuration as the above-described filter structure of the first exemplary embodiment or the second exemplary embodiment except that a reinforcing member 60 is present between the first filter layer 10 and the second filter layer 20.

Although FIG. 4 illustrates an example where the reinforcing member 60 is positioned at the center of the absorption layer 50, only the reinforcing member 60 can be present between the first filter layer 10 and the second filter layer 20 without the absorption layer 50.

The reinforcing member 60 has a function of supporting the first filter layer 10 and the second filter layer 20 so as to not be deformed by a high pressure. The reinforcing member 60 may be formed into any one of a metal rod, a metal mesh, a polymer rod, and a polymer mesh. The filter structure 120 of the third exemplary embodiment can have improved structural stability with the reinforcing member 60.

Figure 5:
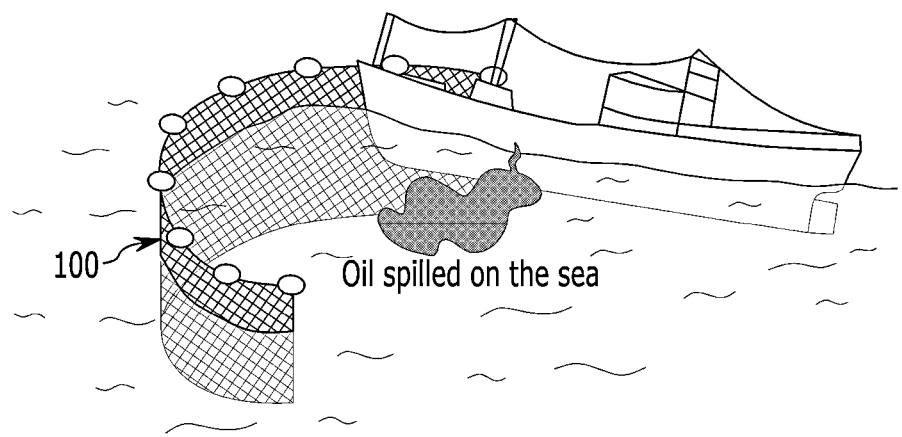
FIG. 5 is a diagram illustrating an application example of the filter structure illustrated in FIG. 1.

FIG. 5 is a diagram illustrating an application example of the above-described filter structure.

Referring to FIG. 5, the filter structure 100 can be manufactured in various shapes and various sizes depending on a purpose of use. For example, in the case of an oil spill from a ship, the filter structure 100 can be installed in the form of a mesh on the sea so as to surround oil spilled on the sea.

The filter structure 100 includes the superhydrophilic surface, and thus does not allow oil to pass therethrough but allows only water to pass therethrough. Therefore, only oil is collected inside the filter structure 100 surrounding the oil spilled on the sea, and water flows out of the filter structure 100. As a result, oil can be easily gathered at one place and the separated oil can be easily collected.

Figure 6A:
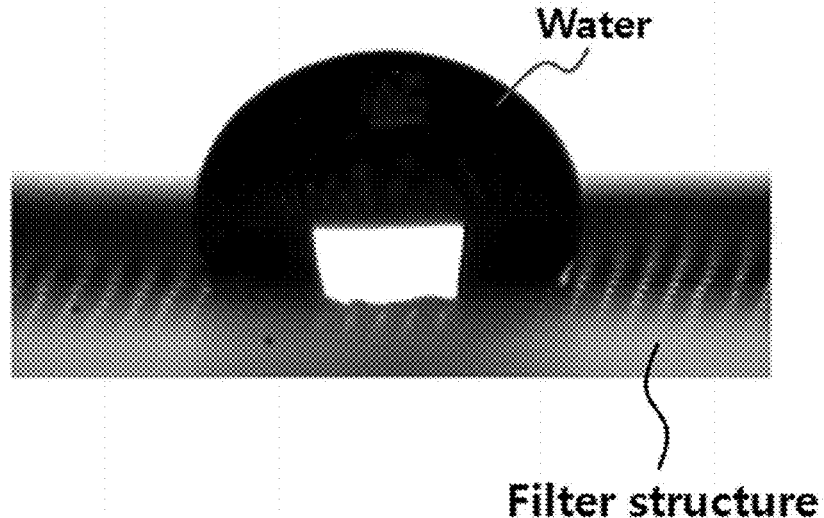
FIG. 6A is a photo taken after water is dropped to a filter structure according to the present exemplary embodiment.
Figure 6B:
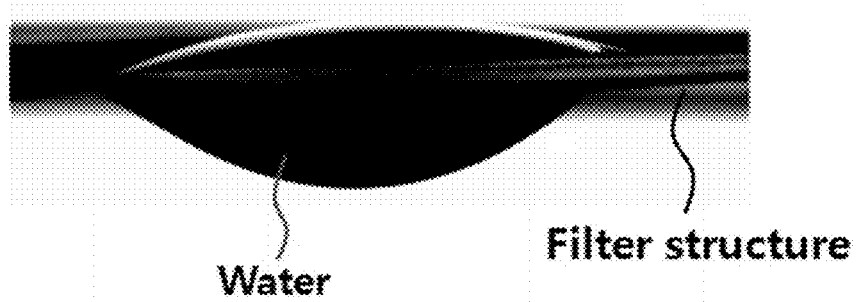
FIG. 6B is a photo taken after water is dropped to a filter structure according to a comparative example in which a first fine protrusion and depression structure and a second fine protrusion and depression structure are not formed.

FIG. 6A is a photo taken after water is dropped to a filter structure according to the present exemplary embodiment, and FIG. 6B is a photo taken after water is dropped to a filter structure according to a comparative example in which a first fine protrusion and depression structure and a second fine protrusion and depression structure are not formed.

Referring to FIG. 6A, the filter structure of the exemplary embodiment has superhydrophilicity with a contact angle of a liquid of less than 10° due to a dual-scale fine structure, and exhibits excellent wettability. However, referring to FIG. 6B, it is confirmed that the filter structure of the comparative example has a contact angle of a liquid of more than 90° and has low wettability.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A filter structure comprising:
   a first filter layer made of metal and including a plurality of openings; and
   a second filter layer made of metal and including a plurality of openings and positioned so as to be overlapped with the first filter layer at a distance from each other,
   wherein the first filter layer and the second filter layer include surfaces each having a dual-scale protrusion and depression structure as a combination of a micro-scale structure and a nano-scale structure, and thus have superhydrophilicity and selectively allow water from a water and oil mixture to pass therethrough, and
   wherein an absorption layer absorbing and storing water is present between the first filter layer and the second filter layer.

2. The filter structure of claim 1, wherein each of the first filter layer and the second filter layer is formed of a metal mesh made from a metal wire in the form of a mesh.

3. The filter structure of claim 1, wherein the protrusion and depression structure includes a first fine protrusion and depression structure formed in a micro-scale and a second fine protrusion and depression structure formed in a nano-scale along curves of the first fine protrusion and depression structure on a surface of the first fine protrusion and depression structure.

4. The filter structure of claim 3, wherein the first fine protrusion and depression structure is formed by any one method of sandblasting, shot blasting, plasma etching, and a laser treatment.

5. The filter structure of claim 3, wherein the second fine protrusion and depression structure is formed by an anodic oxidation process.

6. The filter structure of claim 1, wherein the absorption layer includes at least one selected from hydrogel, silica gel, activated alumina, zeolite, activated carbon, fabric, and sponge.

7. The filter structure of claim 1, wherein a reinforcing member is present between the first filter layer and the second filter layer.

8. The filter structure of claim 7, wherein the reinforcing member is formed into any one of a metal rod, a metal mesh, a polymer rod, and a polymer mesh.

\* \* \* \* \*